United States Patent
Shimizu

[11] 3,738,736
[45] June 12, 1973

[54] PHOTOGRAPHIC LENS SYSTEM OF GREAT RELATIVE APERTURE

[75] Inventor: Yoshiyuki Shimizu, Kawasaki, Japan

[73] Assignee: Nippon Kogaku K.K., Tokyo, Japan

[22] Filed: Dec. 20, 1971

[21] Appl. No.: 209,540

[30] Foreign Application Priority Data
Dec. 25, 1970 Japan............................. 45/125635

[52] U.S. Cl. ............................................. 350/215
[51] Int. Cl. ............................................. G02b 9/62
[58] Field of Search................................... 350/215

[56] References Cited
UNITED STATES PATENTS
3,451,745  6/1969  Kazamaki et al. .............. 350/215 X

*Primary Examiner*—John K. Corbin
*Attorney*—Joseph M. Fitzpatrick, John Thomas Cella, Charles B. Cannon et al.

[57] ABSTRACT

A photographic lens system comprises seven components, which, as viewed in the direction of incidence of light, are a positive component convex to the object side of the lens, a positive component convex to the object side, a negative meniscus component convex to the object side, a negative component having its surface of greater curvature facing the object side, a positive component having its surface of greater curvature facing the image side, a positive meniscus component convex to the image side, and a positive component having its surface of greater curvature facing the object side. An aperture stop is interposed between the third and fourth components. The fourth and fifth components are joined together. The entire system satisfies predetermined conditions, thereby providing a relative aperture of F/1.2, an angle of view 46° and a back focus at least 0.7 times as long as the overall focal length of the system, while various aberrations therein are well corrected.

5 Claims, 13 Drawing Figures

FIG. 1
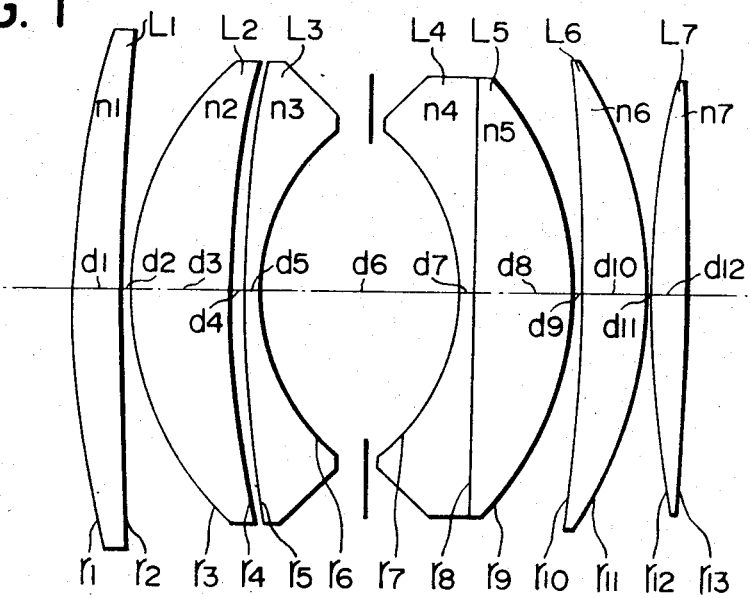
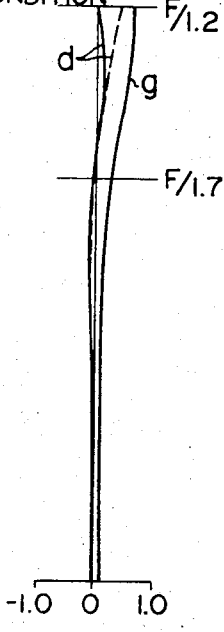
FIG. 2(A)
SPHERICAL ABERRATION ———
SINE CONDITION – – –
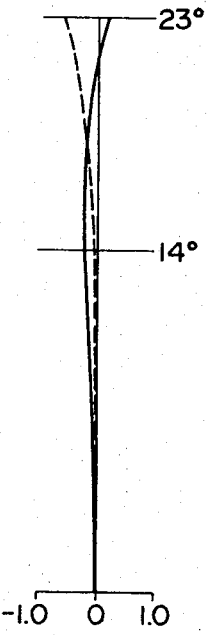
FIG. 2(B)
ASTIGMATISM
MERIDIONAL – – –
SAGITAL ———
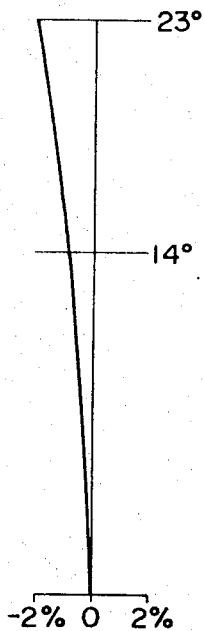
FIG. 2(C)
DISTORSION

SPHERICAL ABERRATION ———
SINE CONDITION ----

ASTIGMATISM
MERIDIONAL ----
SAGITAL ———

DISTORSION

SPHERICAL ABERRATION ———
SINE CONDITION ----

ASTIGMATISM
MERIDIONAL ----
SAGITAL ———

DISTORSION

PHOTOGRAPHIC LENS SYSTEM OF GREAT RELATIVE APERTURE

BACKGROUND OF THE INVENTION

1. Field of the Invention

This invention relates to optical systems, and more particularly, to Gaus type photographic lens systems of great relative aperture usable with single lens reflex cameras and having a relative aperture of F/1.2, an angle of view of 46° and a back focus at least 0.7 times as long as the overall focal length of the system.

2. Description of the Prior Art

In most photographic lens systems having a great relative aperture of the order of F/1.2, the angle of view and the back focus have been limited respectively to the order of 40° and 0.65 times the overall focal length because of difficulties encountered in the correction of aberrations. More specifically, such a small angle of view is attributable to the difficulty of meeting the two incompatible requirements that on the one hand, the surfaces of lenses forming a lens system should desirably have greater radii of curvature or smaller extent of bending in order to provide a greater relative aperture; and on the other hand, the lens surfaces more adjacent to the aperture stop must have smaller radii of curvature or greater extent of bending in order to provide a good flatness of the image plane. Also, the limited back focus is attributable to the fact that a longer back focus would increase the load to the refractive surfaces in the rearward part of the lens system and thereby cause difficulties in the correction of aberrations.

SUMMARY OF THE INVENTION

The present invention overcomes these difficulties and realizes a photographic lens system having a greater relative aperture and a longer back focus than have been achievable heretofore.

According to the present invention, the photographic lens system comprises seven components arranged sequentially in the direction of incidence of light. These components include a first positive component convex to the object side of the system, a second positive meniscus component convex to the object side, a third negative meniscus component convex to the object side, a fourth negative component having its surface of greater curvature facing the object side, a fifth positive component having its surface of greater curvature facing the image side of the lens system, a sixth positive meniscus component convex to the image side, and a seventh positive component having its surface of greater curvature facing the object side. The third and fourth components have an aperture stop interposed therebetween, and the fourth and fifth components are joined together. The lens system satisfies certain conditions which will be described later There has thus been outlined rather broadly the more important features of the invention in order that the detailed description thereof that follows may be better understood, and in order that the present contribution to the art may be better appreciated. There are, of course, additional features of the invention that will be desribed hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification wherein:

FIG. 1 is a longitudinal section view of the photographic lens system according to Example I of the present invention;

FIG.2(A) is a graphic illustration showing the spherical aberration and sine condition in Exmple I of the invention;

FIG. 2(B) is a graphic illustration showing the astigmatism in Example I,

FIG. 2(C) is a graphic illustration showing the distortion in Example I,

Figure 5:
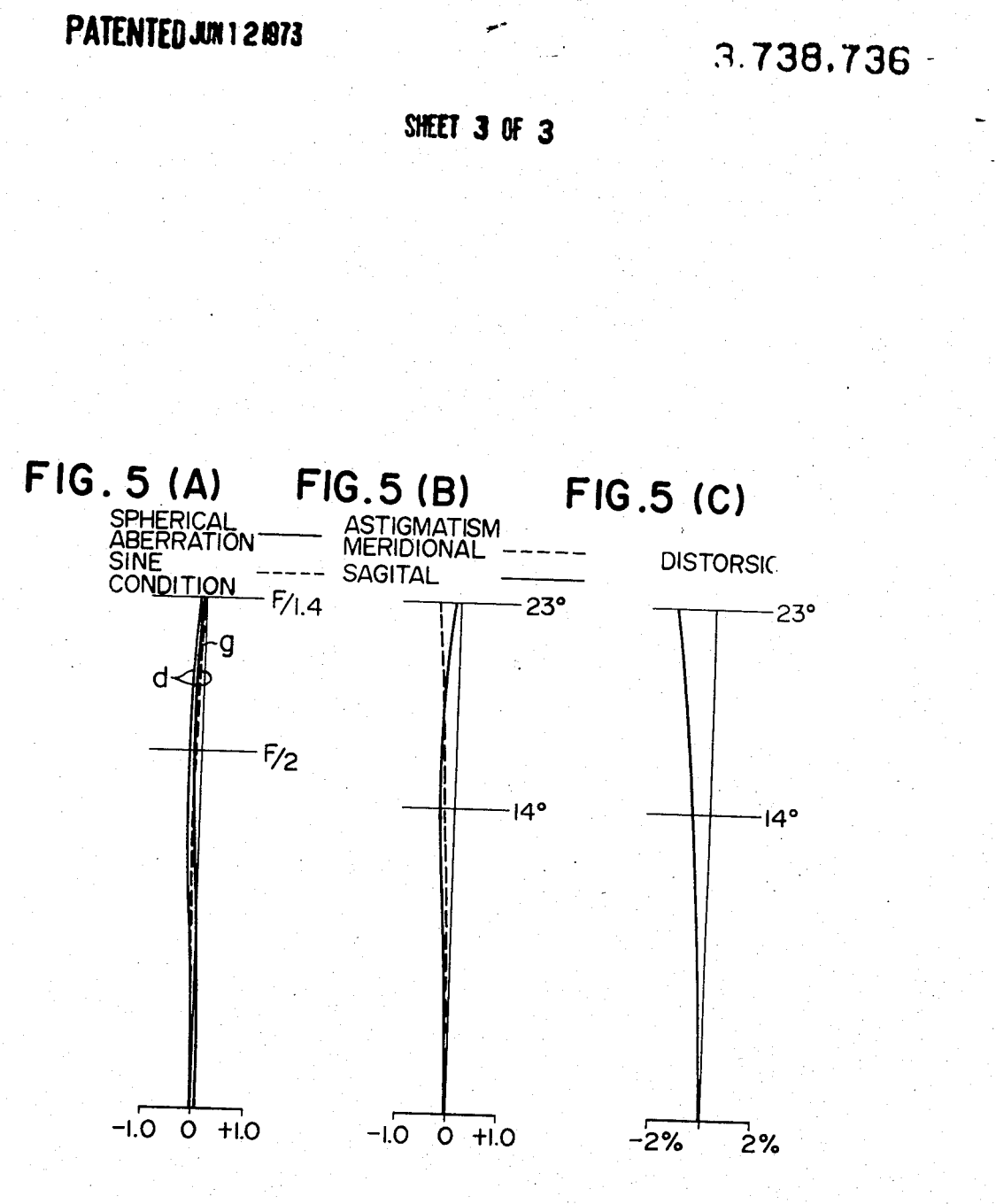

FIG. 5(A) is a graphic illustration showing the spherical aberration and sine condition in Example IV of the invention, FIG. 5(B) is a graphic illustration showing the astigmatism in Example IV, FIG. 5(C) is a graphic illustration showing the distortion in Example IV.

DESCRIPTION OF THE PREFERRED EMBODIMENTS

Figure 3:
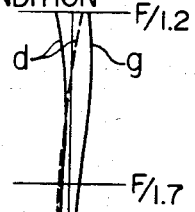
FIG. 3(A) is a graphic illustration showing the spherical aberration and sine condition in Example II of the invention.
FIG. 3(B) is a graphic illustration showng the astigmatism in Example II.
FIG. 3(C) is a graphic illustration showing the distortion in Example II.
Figure 3:
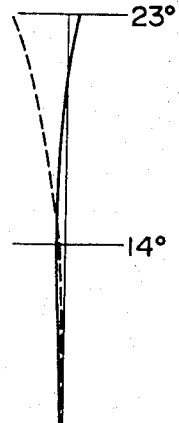
Figure 3:
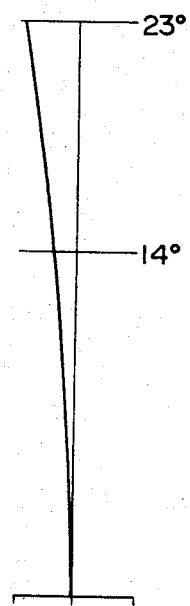
Figure 4:
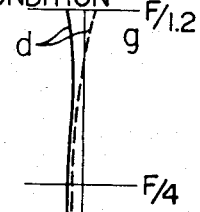
FIG. 4(A) is a graphic illustration showing the spherical aberration and sine condition in Example III of the invention.
FIG. 4(B) is a graphic illustration showing the astigmatism in Example III.
FIG. 4(C) is a graphic illustration showing the distortion in Example III.
Figure 4:
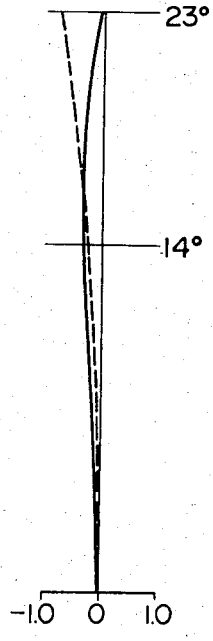
Figure 4:
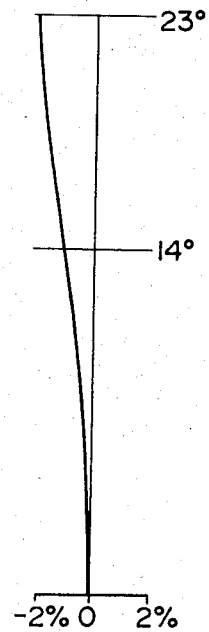

Referring to FIG. 1, the optical system according to the present invention comprises, as viewed in the direction of incidence of light, first and second positive components $L_1$ and $L_2$ both convex to the object side of the system, a third negative meniscus component $L_3$ convex to the object side, a fourth negative component $L_4$ concave to the object side, and a fifth positive component $L_5$ whose surface of greater refractive power faces the image side of the system, The fourth and fifth components $L_4$ and $L_5$ are joined together. An aperture stop is interposed between the third and the fourth components $L_3$ and $L_4$. The optical system further includes a sixth meniscus component $L_6$ convex to the image side, and a seventh positive component $L_7$ whose surface of greater refractive power faces the object side. Let $r_1, r_2' \ldots r_{13}$ be the radii of curvature of the successive surfaces, $d_1, d_2 \ldots d_{12}$ be the intervertex distances between the successive surfaces, $n_1, n_2 \ldots n_7$ be the refractive indices of the respective components, and $f$ be the overall focal length of the entire system. Then, the lens system satisfies the following relations:

$$\begin{cases} 0.7f < r_1 < 1.5f \\ 2f < r_2 < \infty \end{cases} \quad (1)$$

$$\begin{cases} \dfrac{r_6}{1.1} < |r_7| < 1.1 r_6 \\ \dfrac{r_3}{1.1} < |r_9| < 1.1 r_3 \end{cases} \quad (2)$$

$$d_6/1.1 < r + |r_7|/2 < 1.1\, d_6 \ldots \quad (3)$$

$$1 - n_2/r_4 + n_3 - 1/r_5 < 0 \ldots \quad (4)$$

$$0.6f < d_3 + d_4 + d_5 + d_6 + d_7 + d_8 < 0.8f \ldots \quad (5)$$

The significances of these conditions will now be described.

Condition (1) indicates the extent of bending in the component $L_1$, which it is seen has a shape approximate to a convexo-plane lens. Such a shape is useful to correct the spherical aberration as already described, and further serves to correct in the positive direction the negative distortion which often occurs in a lens of long back focus. On the other hand, this shape causes the image plane to be curved in the direction toward the object side. If the component $L_1$ has a greater radius of curvature, or extent of bending, in the direction toward the object side and the value of $r_2$ becomes negative, the negative distortion will be corrected in the positive direction while the image plane will be further curved in the direction toward the object. It is therefore appropriate that the shape of the component $L_1$ should be convexo-plane.

Condition (2) is intended to maintain a good Petzval sum while proiding a long back focus. In the optical system of a double Gauss type, two sets of meniscus components of negative refractive power whose concave surfaces are greatly bent and face the aperture stop, are often effective to reduce the Petzval sum; but the Petzval sum will usually become negative if the radius of curvature or extent of the bending is increased Further, one of these components which is disposed forwardly of the aperture stop is greater in the extent of bending than that which is disposed rearwardly of the aperture stop. This leads to two advantages, one of which is that the bending in the meniscus component forward of the aperture stop can be reduced correspondingly and the radius of curvature in the surface immediately behind the aperture stop, which radius of curvature is negative and often likely to cause a coma, can be increased to thereby minimize the occurrence of the coma. The other advantage is that a component of greater refractive power is provided in the forward part of the optical system more effectively to stop down light beams thereby to reduce the load imparted to the rearward part of the system. However, these advantages are achieved without increasing the back focus at the same time.

According to the present invention therefore, the differences between the values of $r_3$ and $r_9$ and between the values of $r_6$ and $r_7$ are both limited to 10% or less of the respective values. This serves to distribute an equal extent of bending in the two meniscus components just forward and rearward of the aperture stop, thereby maintaining a good Petzval sum while securing a long back focus. As mentioned previously, however, this in turn leads to a slight demerit in the correction of coma.

Such demerit may be compensated for by condition (3), which determines the value of $d_7$ at a level substantially equal to the average value of $r_6$ and $r_7$ so that the height of incidence at which the light beams entering with an angle of view impinge on the surface just rearward of the aperture stop can be raised thereby to prevent occurrence of coma.

Condition (4) indicated that the air lens spacing the components $L_2$ and $L_3$ apart from each other has a negative power. This serves to curve the image plane in the positive direction and negate the tendency of the image plane to curve in the negative direction as the result of the low extent of bending in the component $L_1$.

Condition (5) relates to the dimensions of the entire lens systen. If the upper limit of this condition is exceeded, vignetting will be increased to reduce the angle of view. If the lower limit of the condition is not reached, the values of $d_3$, $d_4$, $d_5$, $d_7$ and $d_8$ will be reduced thereby to destory the balance of the aberrations and also reduce the values of $r_6$ and $r_7$ in accordance with condition (3), thus resulting in an increased coma. The component $L_6$ which is a meniscus lens convex to the image side is useful to increase the back focus, and the component $L_7$ whose surface of greater refractive power faces the object side is useful to provide a shape more aplanatic to the light beams parallel to the optical axis than in the converse case, thereby facilitating the correction of spherical aberration.

Various examples of the present invention will be shown in the tables below, where $r$ represents the radius of curvature of each component, $d$ the intervertex distance between adjacent surfaces, $nd$ the refractive index of each component, and $vd$ the dispersive power of each component.

EXAMPLE I $f = 100.0$, Relative aperture F/1.2,

Angle of view 46°, Back focus 75.7.

| | | | |
|---|---|---|---|
| $r_1$=+129.845 | $d_1$=10.08 | $nd$=1.79631 | $vd$=40.8 |
| $r_2$=+1490.891 | $d_2$=0.19 | | |
| $r_3$=+55.233 | $d_3$=16.09 | $nd$=1.744 | $vd$=44.9 |
| $r_4$=+116.279 | $d_4$=2.91 | | |
| $r_5$=+168.605 | $d_5$=2.91 | $nd$=1.68893 | $vd$=31.1 |
| $r_6$=+35.252 | $d_6$=34.50 | | |
| $r_7$=−35.271 | $d_7$=2.13 | $nd$=1.7847 | $vd$=26.1 |
| $r_8$=∞ | $d_8$=16.86 | $nd$=1.74443 | $vd$=49.4 |
| $r_9$=−55.039 | $d_9$=0.19 | | |
| $r_{10}$=−348.837 | $d_{10}$=11.82 | $nd$=1.72 | $vd$=50.2 |
| $r_{11}$=−67.248 | $d_{11}$=0.19 | | |
| $r_{12}$=+178.566 | $d_{12}$=6.20 | $nd$=1.76684 | $vd$=46.6 |
| $r_{13}$=−503.465 | | | |

EXAMPLE II $f = 100.0$, Relative aperture F/1.2,

Angle of view 46°, Back focus 75.6'

| | | | |
|---|---|---|---|
| $r_1$=+129.845 | $d_1$=10.08 | $nd$=1.79631 | $vd$=40.8 |
| $r_2$=+1490.891 | $d_2$=0.19 | | |
| $r_3$=+54.264 | $d_3$=16.47 | $nd$=1.744 | $vd$=44.9 |
| $r_4$=+116.279 | $d_4$=2.91 | | |
| $r_5$=+165.116 | $d_5$=2.52 | $nd$=1.68893 | $vd$=3.1 |
| $r_6$=+34.302 | $d_6$=34.50 | | |
| $r_7$=−34.941 | $d_7$=2.13 | $nd$=1.7847 | $vd$=26.1 |
| $r_8$=∞ | $d_8$=17.44 | $nd$=1.74443 | $vd$=49.4 |
| $r_9$=−54.457 | $d_9$=0.19 | | |
| $r_{10}$=−387.597 | $d_{10}$=11.82 | $nd$=1.72 | $vd$=50.2 |
| $r_{11}$=−67.248 | $d_{11}$=0.19 | | |
| $r_{12}$=+178.566 | $d_{12}$=6.20 | $nd$=1.76684 | $vd$=46.6 |
| $r_{13}$=−617.036 | | | |

EXAMPLE III $f = 100.0$, Relative aperture F/1.2,

Angle of view 46°, Back focus 74.2.

| | | | |
|---|---|---|---|
| $r_1=+125.969$ | $d_1=10.85$ | $nd=1.79631$ | $vd=40.8$ |
| $r_2=+968.992$ | $d_2=0.19$ | | |
| $r_3=+56.202$ | $d_3=15.5$ | $nd=1.76684$ | $vd=46.6$ |
| $r_4=+115.310$ | $d_4=2.91$ | | |
| $r_5=+155.039$ | $d_5=2.91$ | $nd=1.68893$ | $vd=31.1$ |
| $r_6=+35.754$ | $d_6=34.50$ | | |
| $r_7=-35.601$ | $d_7=2.13$ | $nd=1.7552$ | $vd=27.5$ |
| $r_8=\infty$ | $d_8=16.67$ | $nd=1.77279$ | $vd=49.5$ |
| $r_9=-57.171$ | $d_9=0.19$ | | |
| $r_{10}=-237.500$ | $d_{10}=11.82$ | $nd=1.713$ | $vd=53.9$ |
| $r_{11}=-67.054$ | $d_{11}=0.19$ | | |
| $r_{12}=+176.357$ | $d_{12}=6.40$ | $nd=1.76684$ | $vd=46.6$ |
| $r_{13}=-416.759$ | | | |

EXAMPLE IV $f = 100.0$, Relative aperture F/1.4,

Angle of view 46°, Back focus 74.0.

| | | | |
|---|---|---|---|
| $r_1=+79.457$ | $d_1=7.75$ | $nd=1.76684$ | $vd=46.6$ |
| $r_2=+300.388$ | $d_2=0.19$ | | |
| $r_3=+51.395$ | $d_3=9.88$ | $nd=1.79631$ | $vd=40.8$ |
| $r_4=+77.519$ | $d_4=5.81$ | | |
| $r_5=+84.302$ | $d_5=1.55$ | $nd=1.72825$ | $vd=28.3$ |
| $r_6=+31.976$ | $d_6=31.97$ | | |
| $r_7=-31.976$ | $d_7=1.74$ | $nd=1.74077$ | $vd=27.7$ |
| $r_8=-1162.8$ | $d_8=14.73$ | $nd=1.77279$ | $vd=49.5$ |
| $r_9=-51.977$ | $d_9=0.19$ | | |
| $r_{10}=-199.612$ | $d_{10}=10.66$ | $nd=1.77279$ | $vd=49.5$ |
| $r_{11}=-61.087$ | $d_{11}=0.19$ | | |
| $r_{12}=+251.938$ | $d_{12}=5.43$ | $nd=1.79631$ | $vd+40.8$ |
| $r_{13}=-449.946$ | | | |

From the foregoing description, it will be appreciated that the present invention provides a Gauss type photographic lens system which has a relative aperture as great as F/1.2, an angle of view as wide as 46° and a back focus at least 0.7 times as long as the overall focal length, and in which various aberrations have been well corrected.

I claim;

1. A photographic lens system of great relative aperture comprising, as viewed in the direction of incidence of light, a first positive component convex to the object side of the system, a second positive meniscus component convex to said object side, a third negative meniscus component convex to said object side, a fourth negative component having its surface of greater curvature facing said object side, a fifth positive component having its surface of greater curvature facing the image side of the system, a sixth positive meniscus component having its surface of greater curvature facing said object side, said third and fourth component having an aperture stop interposed therebetween, said lens system satisfying the relationships:

$$0.7f < r_1 < 1.5f$$

$$2f < r_2 < \infty$$

$$r_6/1.1 < r_7 < 1.1\, r_6$$

$$r_3/1.1 < r_9 < 1.1\, r_3$$

$$d_6/1.1 < (r_6 + r_7)/2 < 1.1\, d_6$$

$$(1 - n_2)/r_4 + (n_3 - 1)/r_5 < 0$$

$$0.6f < d_3 + d_4 + d_5 + d_6 + d_7 + d_8 < 0.8f$$

where $f$ represents the overall focal length of the lens system, $r$ the radius of curvature of each surface of said components, $d$ the intervertex distance between adjacent surfaces of said components, and $n$ the refractive index of each of said components.

2. A lens system as defined in claim 1, wherein said components having the following characteristics:

$f=100.0$, Relative aperture F/1.2,
Angle of view 46°, Back focus 75.7

| | | | |
|---|---|---|---|
| $r_1=+129.845$ | $d_1=10.08$ | $nd=1.79631$ | $v=40.8$ |
| $r_2=+1490.891$ | $d_2=0.19$ | | |
| $r_3=+55.233$ | $d_3=16.09$ | $nd=1.744$ | $vd=44.9$ |
| $r_4=+116.279$ | $d_4=2.91$ | | |
| $r_5=+168.605$ | $d_5=2.91$ | $nd=1.68893$ | $vd=31.1$ |
| $r_6=+35.252$ | $d_6=34.50$ | | |
| $r_7=-35.271$ | $d_7=2.13$ | $nd=1.7847$ | $vd=26.1$ |
| $r_8=\infty$ | $d_8=16.86$ | $nd=1.74443$ | $vd=49.4$ |
| $r_9=-55.039$ | $d_9=0.19$ | | |
| $r_{10}=-348.837$ | $d_{10}=11.82$ | $nd=1.72$ | $vd=50.2$ |
| $r_{11}=-67.248$ | $d_{11}=0.19$ | | |
| $r_{12}=+178.566$ | $d_{12}=6.20$ | $nd=1.76684$ | $vd=46.6$ |
| $r_{13}=-503.465$ | | | |

3. A lens system as defined in claim 1, wherein said components having the following characteristics:

$f = 100.0$, Relative aperture F/1.2,
Angle of view 46°, Back focus 75.6.

| | | | |
|---|---|---|---|
| $r_1=+129.845$ | $d_1=10.08$ | $nd=1.79631$ | $vd=40.8$ |
| $r_2=+1490.891$ | $d_2=0.19$ | | |
| $r_3=+54.264$ | $d_3=16.47$ | $nd=1.744$ | $vd=44.9$ |
| $r_4=+116.279$ | $d_4=2.91$ | | |
| $r_5=+165.116$ | $d_5=2.52$ | $nd=1.68893$ | $vd=31.1$ |
| $r_6=+34.302$ | $d_6=34.50$ | | |
| $r_7=-34.941$ | $d_7=2.13$ | $nd=1.7847$ | $vd=26.1$ |
| $r_8=\infty$ | $d_8=17.44$ | $nd=1.74443$ | $vd=49.4$ |
| $r_9=-54.457$ | $d_9=0.19$ | | |
| $r_{10}=-387.597$ | $d_{10}=11.82$ | $nd=1.72$ | $vd=50.2$ |
| $r_{11}=-67.248$ | $d_{11}=0.19$ | | |
| $r_{12}=+178.566$ | $d_{12}=6.20$ | $nd=1.76684$ | $vd=46.6$ |
| $r_{13}=-617.036$ | | | |

4. A lens system as defined in claim 1, wherein said components having the following characteristics:

$f = 100.0$, Relative aperture F/1.2,
Angle of view 46°, Back focus 74.2

| | | | |
|---|---|---|---|
| $r_1=+125.969$ | $d_1=10.85$ | $nd=1.79631$ | $vd=40.8$ |
| $r_2=+968.992$ | $d_2=0.19$ | | |
| $r_3=+56.202$ | $d_3=15.5$ | $nd=1.76684$ | $vd=46.6$ |
| $r_4=+115.310$ | $d_4=2.91$ | | |
| $r_5=+155.039$ | $d_5=2.91$ | $nd=1.68893$ | $vd=31.1$ |
| $r_6=+35.754$ | $d_6=34.50$ | | |
| $r_7=-35.601$ | $d_7=2.13$ | $nd=1.7552$ | $vd=27.5$ |
| $r_8=\infty$ | $d_8=16.67$ | $nd=1.77279$ | $vd=49.5$ |
| $r_9=-57.171$ | $d_9=0.19$ | | |
| $r_{10}=-237.500$ | $d_{10}=11.82$ | $nd=1.713$ | $vd=52.9$ |
| $r_{11}=-67.054$ | $d_{11}=0.19$ | | |
| $r_{12}=+176.357$ | $d_{12}=6.40$ | $nd=1.76684$ | $vd=46.6$ |
| $r_{13}=-416.759$ | | | |

5. A lens system as defined in claim 1, wherein said components having the following characteristics:

$f = 100.0$, Relative aperture F/1.4,
Angle of view 46°, Back focus 74.0

| | | | |
|---|---|---|---|
| $r_1=+79.457$ | $d_1=7.75$ | $nd=1.76684$ | $vd=46.6$ |
| $r_2=+300.388$ | $d_2=0.19$ | | |
| $r_3=+51.395$ | $d_3=9.88$ | $nd=1.79631$ | $vd=40.8$ |
| $r_4=+77.519$ | $d_4=5.81$ | | |
| $r_5=+84.302$ | $d_5=1.55$ | $nd=1.72825$ | $vd=28.3$ |
| $r_6=+31.976$ | $d_6=31.97$ | | |
| $r_7=-31.976$ | $d_7=1.74$ | $nd=1.74077$ | $vd=27.7$ |
| $r_8=-1162.8$ | $d_8=14.73$ | $nd=1.77279$ | $vd=49.5$ |
| $r_9=-51.977$ | $d_9=0.19$ | | |
| $r_{10}=-199.612$ | $d_{10}=10.66$ | $nd=1.77279$ | $vd=49.5$ |
| $r_{11}=-61.087$ | $d_{11}=01.9$ | | |
| $r_{12}=+251.938$ | $d_{12}=5.43$ | $nd=1.79631$ | $vd=40.8$ |
| $r_{13}=-449.946$ | | | |

* * * * *

91.308

UNITED STATES PATENT OFFICE
CERTIFICATE OF CORRECTION

Patent No. 3,738,736      Dated June 12, 1973

Inventor(s) YOSHIYUKI SHIMIZU

It is certified that error appears in the above-identified patent and that said Letters Patent are hereby corrected as shown below:

Column 1, line 27, change "Also" to -- Also --; line 55, after "later", insert -- . --; line 66, change "carry1ng" to -- carrying --.
Column 2, line 15, change "Exmple" to -- Example --; line 24, change "showng" to -- showing --.
Column 3, line 8, change "$d_6/1.1 < r+ |r_7|/2 < 1.1 d_6$" to -- $d_6/1.1 < r_6 + |r_7|/2 < 1.1 d_6$ --; line 37, change "proiding" to -- providing --; line 43, after "increased", insert a -- . --; line 62, change "$r_9$" to -- $|r_9|$ --; line 63, change "$r_7$" to -- $|r_7|$ --.
Column 4, line 6, change "$r_7$" to -- $|r_7|$ --; line 11, change "indicated" to -- indicates --; line 18, change "systen" to -- system --; line 22, change "destory" to -- destroy --; line 23, change "$r_7$" to -- $|r_7|$ --;
in Example II, col. 4, change "$\nu d=3.1$" to -- $\nu d=31.1$ --.
Column 5, line 56, change "$r_7$" to -- $|r_7|$ --; line 57, change "$r_9$" to -- $|r_9|$ --; line 58, change "$r_7$" to -- $|r_7|$ --.
Column 6, line 9, change "$\nu=40.8$" to -- $\nu d=40.8$ --; line 45, change "$\nu d=52.9$" to -- $\nu d=53.9$ --; line 61, change "$d_{11}=01.9$" to -- $d_{11}=0.19$ --.

Signed and sealed this 19th day of March 1974.

(SEAL)
Attest:

EDWARD M. FLETCHER, JR.           C. MARSHALL DANN
Attesting Officer                  Commissioner of Patents